(12) United States Patent  
Anderson

(10) Patent No.: US 7,991,124 B2  
(45) Date of Patent: *Aug. 2, 2011

(54) METHOD AND SYSTEM FOR COLLECTING CONTEMPORANEOUS INFORMATION RELATING TO A CRITICAL EVENT

(75) Inventor: Eric C. Anderson, San Jose, CA (US)

(73) Assignee: Scenera Technologies, LLC, Portsmouth, NH (US)

(*) Notice: Subject to any disclaimer, the term of this patent is extended or adjusted under 35 U.S.C. 154(b) by 0 days.

This patent is subject to a terminal disclaimer.

(21) Appl. No.: 12/627,112

(22) Filed: Nov. 30, 2009

(65) Prior Publication Data

US 2010/0075629 A1    Mar. 25, 2010

Related U.S. Application Data

(63) Continuation of application No. 11/080,285, filed on Mar. 14, 2005, now Pat. No. 7,646,854.

(51) Int. Cl.  
*H04M 11/00* (2006.01)

(52) U.S. Cl. ......................... 379/45; 455/404.2

(58) Field of Classification Search ............ 379/45, 379/37–40; 455/404.1, 404.2  
See application file for complete search history.

(56) References Cited

U.S. PATENT DOCUMENTS

| | | | |
|---|---|---|---|
| 4,825,457 A | 4/1989 | Lebowitz | |
| 5,027,104 A | 6/1991 | Reid | |
| 5,406,324 A | 4/1995 | Roth | |
| 5,717,379 A | 2/1998 | Peters | |
| 6,255,942 B1 | 7/2001 | Knudsen | |
| 6,278,884 B1 | 8/2001 | Kim | |
| 6,466,258 B1 | 10/2002 | Mogenis et al. | |
| 6,567,502 B2 | 5/2003 | Zellner | |
| 6,748,052 B2 | 6/2004 | Zellner et al. | |
| 6,748,223 B2 | 6/2004 | Fraccaroli | |
| 7,646,854 B2 * | 1/2010 | Anderson | 379/45 |
| 2002/0118796 A1 | 8/2002 | Menard et al. | |
| 2002/0118797 A1 | 8/2002 | Masuda | |
| 2002/0137528 A1 | 9/2002 | Fraccaroli | |
| 2003/0069002 A1 | 4/2003 | Hunter et al. | |
| 2003/0085989 A1 | 5/2003 | Tay | |
| 2003/0162557 A1 | 8/2003 | Shida | |
| 2003/0190017 A1 | 10/2003 | Zellner et al. | |
| 2003/0207670 A1 | 11/2003 | Fernandez et al. | |
| 2004/0023635 A1 | 2/2004 | Impson et al. | |
| 2004/0085203 A1 | 5/2004 | Junqua | |
| 2004/0105529 A1 | 6/2004 | Salvucci et al. | |
| 2004/0179092 A1 | 9/2004 | LaPoint | |
| 2004/0185900 A1 | 9/2004 | McElveen | |
| 2004/0201473 A1 | 10/2004 | Lee | |
| 2005/0003797 A1 | 1/2005 | Baldwin | |
| 2005/0220277 A1 | 10/2005 | Blalock et al. | |

FOREIGN PATENT DOCUMENTS

| | | |
|---|---|---|
| JP | 03-217060 | 7/2003 |
| JP | 03-219062 | 7/2003 |
| JP | 03-273972 | 9/2003 |
| JP | 04-040733 | 2/2004 |

* cited by examiner

*Primary Examiner* — Stella L Woo

(57) ABSTRACT

The present invention is directed to a method and system for collecting contemporaneous information relating to a critical event. The method includes receiving a call requesting an emergency response to a critical event and in response to the call, using at least one communication network to transmit a request for supplemental information from reporting devices located in a specified area related to the critical event. The supplemental information is received over the at least one communication network.

18 Claims, 4 Drawing Sheets

METHOD AND SYSTEM FOR COLLECTING CONTEMPORANEOUS INFORMATION RELATING TO A CRITICAL EVENT

CROSS-REFERENCE TO RELATED APPLICATIONS

This application is a Continuation application of U.S. patent application Ser. No. 11/080,285, filed Mar. 14, 2005, titled "Method and System For Collecting Contemporaneous Information Relating to a Critical Event," (now U.S. Pat. No. 7,646,854, issued Jan. 12, 2010), which is commonly owned with this application and is herein incorporated by reference.

FIELD OF THE INVENTION

The present invention relates to an emergency response system, and more particularly to a method and system for collecting contemporaneous information relating to a critical event.

BACKGROUND

In the event of an emergency, most if not all countries allow a person to request aid or to report an emergency through a public emergency notification system. For example, in the United States, a person can use the telephone system to notify emergency response personnel of an impending or pending emergency by entering the numbers 9-1-1 into any device coupled to the telephone network. This particular sequence of numbers is routed directly to an emergency response center where an operator collects information from the person reporting the incident. This information typically includes the nature of the emergency and the location of the caller, as well as other information that can assist the operator in dispatching the appropriate emergency response personnel.

Based on the information culled from the caller, the operator must determine which emergency response personnel to alert. Nevertheless, in some circumstances, the information provided by the caller can be limited, i.e., the caller is not sure of his or her location, or the information can be inadequate, i.e., the caller is not able to provide detailed information or is not aware of the totality of the circumstances. For example, the caller might be reporting a strange chemical smell, but not realize that a building is on fire a few yards away. The operator may alert a hazardous materials inspection team, but not necessarily the fire department. While corrective measures can be taken once the alerted emergency personnel arrive on the scene, e.g., the hazardous materials inspectors can determine that the fire department must be alerted, precious time is wasted.

Moreover, the information provided by the caller is but one snapshot in time. Once the call is terminated, the emergency response operator has no way of monitoring the event. Thus, if an emergency situation morphs into another emergency situation, i.e., a domestic dispute turns into a child abduction situation, the operator has no way of responding to this unless the caller initiates another 9-1-1 call.

Accordingly, what is needed is an improved method and system for collecting information about a critical event such as an emergency situation. The method and system should allow an emergency response center to receive appropriate and adequate information to alert the appropriate responders. In addition, the center should be able to continue monitoring a critical event so that new developments can be detected and the proper alerts issued in a timely manner. The present invention addresses such a need.

SUMMARY

In one embodiment, the present invention is directed to a method for collecting contemporaneous information relating to a critical event that includes receiving a call requesting an emergency response to a critical event and, in response to the call, using at least one communication network to transmit a request for supplemental information from reporting devices located in a specified area related to the critical event. The supplemental information is received over the at least one communication network.

According to an embodiment of the present invention, supplemental information relating to a reported emergency is provided by a plurality of wired and mobile device users that are located in specified areas related to the emergency, e.g., the vicinity of the reported emergency. The supplemental information can be provided verbally, in the form of text messages, or in the form of captured image data from telephones, PDAs, mobile phones, and mobile camera phones for example. Periodic updates can be requested to monitor continuously the development of the emergency situation.

DETAILED DESCRIPTION

The present invention relates to an emergency response system, and more particularly to a method and system for collecting contemporaneous information relating to a critical event. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiments shown, but is to be accorded the widest scope consistent with the principles and features described herein.

According to the preferred embodiment of the present invention, information relating to a critical event is collected by an emergency response center via wireless and wired communication networks. The information is provided by a plurality of wired and wireless reporting devices that are also coupled to the wired and wireless communication network. When a critical event is identified, the emergency response center transmits requests over the communication networks for supplemental information regarding the critical event from the plurality of reporting devices. This supplemental information is transmitted back to the emergency response center for processing. In the preferred embodiment, the wireless communication network is a cellular telephone communication system and the reporting devices include mobile and wired telephones.

Figure 1:
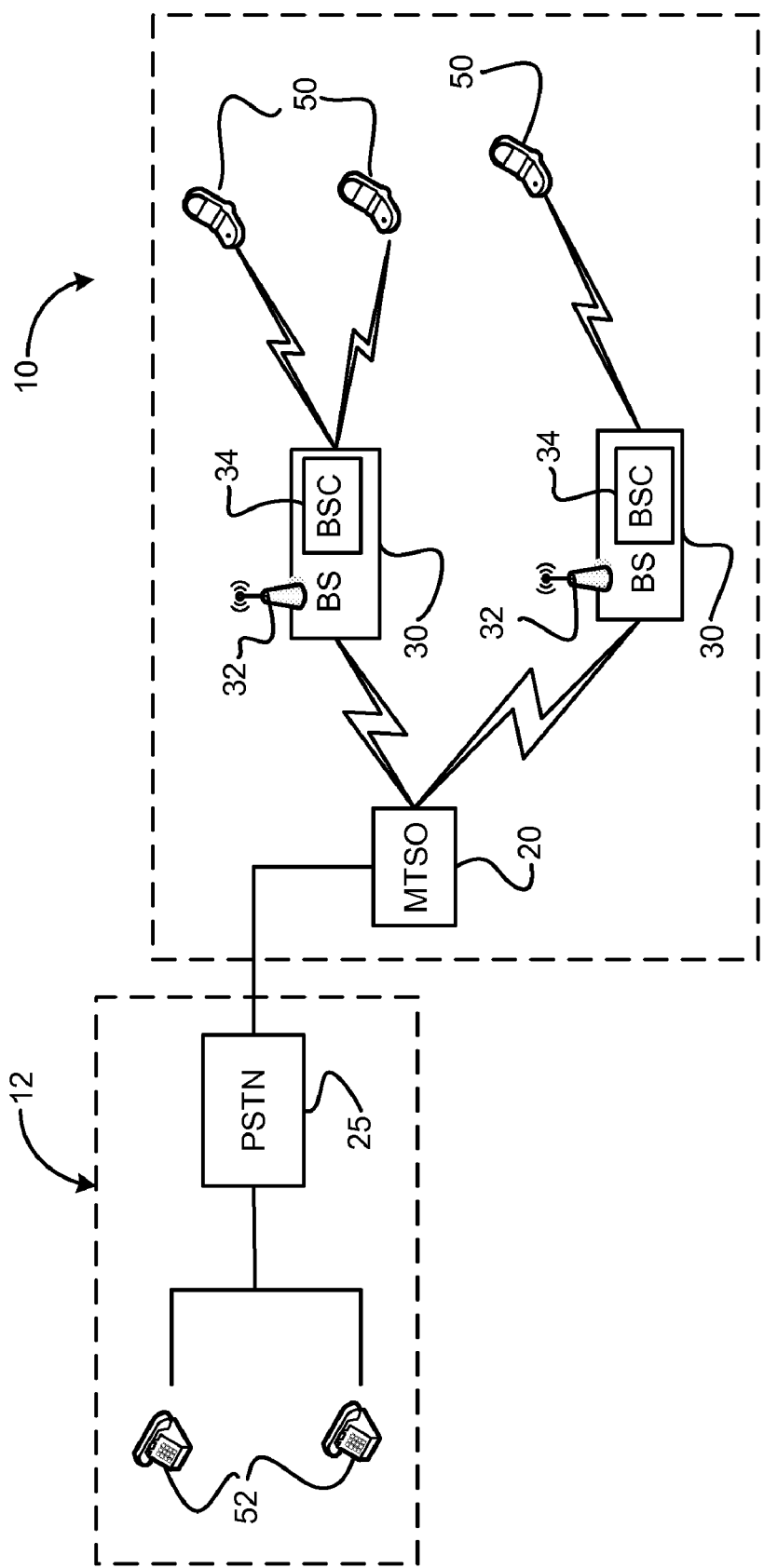
FIG. 1 is a schematic diagram of an exemplary communication network.

FIG. 1 is a schematic diagram of a conventional communication network system that includes wired and wireless phone systems. The wired phone system 12 includes a public switching telephone network (PSTN) 25 and a plurality of wired telephones 52. The wired telephones 52 are associated with a fixed location, e.g., an office building, residence, or store. The PSTN 25 receives and routes calls from the wired telephones 52 to other wired telephones 52 and to the wireless phone system 10.

The wireless phone system 10 includes at least one cellular tower 32 coupled to a base station 30, a mobile telecommunications switching office (MTSO) 20, and a public switching telephone network (PSTN) 25, which is coupled to the MTSO 20. Each tower 32 services a defined geographical area, known as a cell. A cellular tower 32 may be located at any suitable location, e.g., on top of a mountain or building, and may include several emitters (not shown). Each emitter may output multiple signals including, for example, a control channel and voice channels for communicating with a plurality of mobile wireless devices 50, e.g., cell phones, PDAs, etc.

Generally, each emitter may cover a separate geographical area, known as a sector, of a particular cell. Each sector may differ in a known manner by frequency or code depending on whether the cellular system 10 employs an analog or a digital format and, also in a known manner, on the particular radio access technology of the cellular system 10. Examples of radio access technology systems include frequency division multiple access (FDMA), time division multiple access (TDMA), code division multiple access (CDMA), and space division multiple access (SDMA). Where the cellular system 10 does not have a capability to calculate latitude and longitude of a handset, the identification of a sector as a whole may be the smallest cellular unit area in which the location of devices 50 may be identified. SDMA technology, however, allows a sector to be subdivided into smaller cells, thereby reducing the geographical size of the smallest cellular unit area.

Each base station (BS) 30 may include a transmitter and a scanning receiver that are coupled to a base station controller (BSC) 34. The base station controller 34 may be housed at the same location as the base station 30, as shown, or may be located some distance away and may control multiple base stations 30, as in Global System for Mobile Communication (GSM) networks. The base station controller 34 may comprise a processor and a temporary storage and a permanent storage and operates to receive data input concerning various mobile devices 50 from the MTSO 20. The base station controller 34 may also provide local control over a base station 30 including establishing control channel and voice channel communication with various mobile devices 50. The base station controller 34 may also be configured to establish a particular geographical location of a mobile device 50 through use of various techniques such as time difference of arrival, angle of arrival, and signal pattern matching, or in combination with information provided by a device 50 such as assisted global positioning satellite (a-GPS).

The base station controller 34 may communicate via any suitable communication link such as a wire, a fiber optic system, or a microwave system, with the MTSO 20. The MTSO 20 is responsible for receiving and routing calls from the mobile devices 50 in the cellular network 10. The MTSO 20 receives all calls from the BS's 30 under its control and routes these calls to other BS's 30 and devices 50 in the network 10, as well as connects to the PSTN 25 or dedicated servers, routers, or tandems available for specialized purposes. The MTSO 20 also can authenticate mobile devices 50 before they can be used to make calls, provide high level command and control over the base station controllers 34, and switch calls between cells as mobile devices 50 travel across cell boundaries.

Each mobile device, e.g., mobile phone 50, registers itself with a particular cell having the strongest forward control channel signal emitted from the associated tower 32. This cell is typically associated with the geographical location of the mobile phone 50. To register, the device 50 typically uses a reverse control path to transmit identifying information, such as its phone number, its electronic serial number, and its home system ID, to the associated base station controller 34. The base station controller 34 relays this information to the MTSO 20, which communicates with different sources, switching centers and databases to verify that the mobile device 50 has rights to access the network 10.

Once the mobile phone 50 is registered, it can receive incoming calls. Notably, registration is an ongoing process that is triggered either by the device 50 moving to a different cell or by the expiration of a predetermined time period. The base station controller 34 can initiate registration requests independently by transmitting a signal to each mobile device 50 in its cell instructing the mobile device 50 to identify itself. In such a manner, the base station controller 34 for a particular service area and the MTSO 20 are aware of the mobile devices 50 in the service area and each device's approximate location.

Many mobile telephones 50 are now equipped with a GPS chipset so that the user can determine with accuracy his or her location. Some service providers allow GPS enabled mobile telephones to be tracked. Moreover, in the United States, government standards, namely the "Enhanced 911 (E-911)" rules promulgated by the Federal Communications Commission, require that the location of a wireless caller be able to be determined without the caller's assistance. Although several techniques can be used to locate the mobile telephone 50, e.g., using the signal to calculate time difference of arrival, angle of arrival, and signal pattern matching, etc., the most promising solutions use GPS technology. Accordingly, most if not all mobile telephones in the United States will eventually be GPS enabled. With GPS, the mobile telephone 50 can automatically determine and relay its location data (longitude, latitude, elevation, etc.) whenever it registers with the base station 30, or upon request by the base station controller 34.

Figure 2:
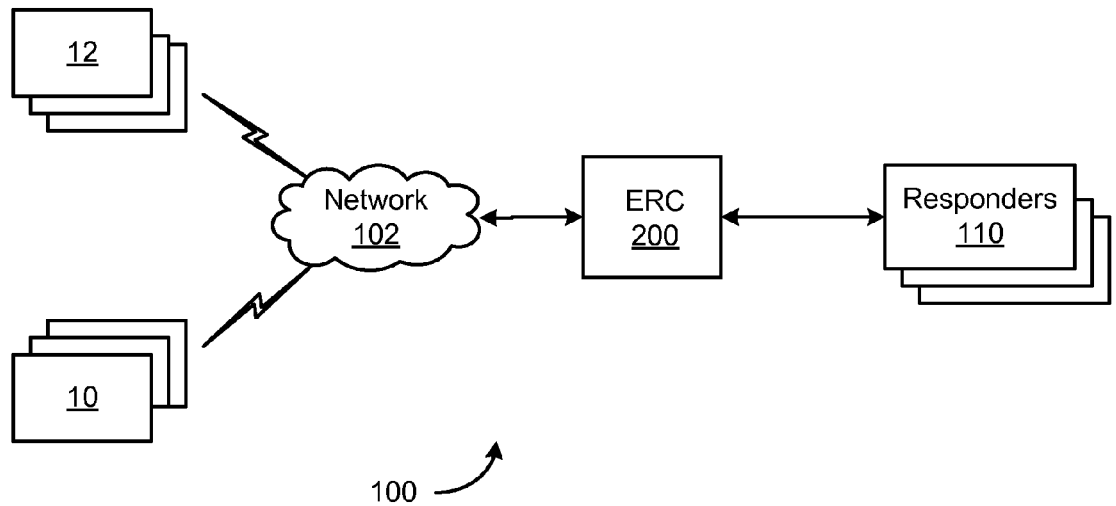
FIG. 2 is schematic block diagram of an exemplary emergency response network according to an embodiment of the present invention.

According to an embodiment of the present invention, an Emergency Response Center (ERC) is in communication with a plurality of wireless 10 and wired 12 communication network systems and coordinates the collection of contemporaneous information using the plurality of networks 10, 12. FIG. 2 is schematic block diagram illustrating an exemplary emergency response network according to an embodiment of the present invention. As is shown, the ERC 200 is coupled to a plurality of wired networks 12 and to a plurality of wireless networks 10 for communicating with wired 52 and mobile 50 devices via a network 102 that can be a secure LAN, WAN or any other suitable secure communication connection. In one embodiment, the ERC 200 is coupled to the plurality of wireless networks 10 via each network's MTSO 20 (FIG. 1) and to the plurality of wired networks 12 via the PSTN 25 (FIG. 1). The ERC 200 is also in communication with a plurality of critical event responders 110, e.g., law enforcement personnel, a fire department, the FBI, the Department of Homeland Security, etc.

Figure 3:
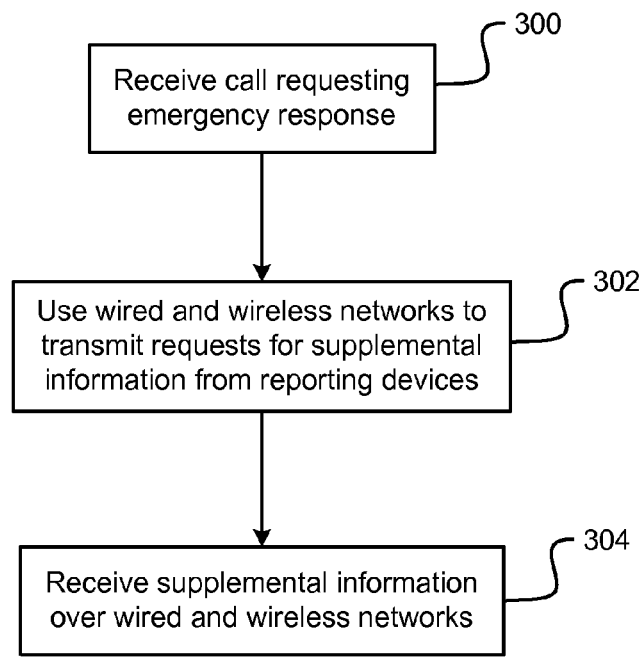
FIG. 3 is a flowchart illustrating a process for collecting information relating to a critical event according to an embodiment of the present invention.

FIG. 3 is a flowchart illustrating a process for collecting contemporaneous information relating to a critical event according to an embodiment of the present invention. Referring to FIG. 2 and FIG. 3, a call is received requesting an emergency response to a critical event (step 300) and in response, the ERC 200 uses the wireless 10 and wired 12 communication networks to transmit requests for supplemental information relating to the critical event from wireless mobile devices 50 and from wired devices 52 (collectively referred to as "reporting devices") that are located in specified areas related to the critical event (step 302). The supplemental information can be provided in a verbal conversation, a text message, a video clip, or a captured digital image, depending on the capabilities of the reporting device 50, 52. The ERC 200 receives and collects the requested supplemental information from the reporting devices 50, 52 (step 304) over the wireless 10 and wired 12 communication networks.

In one embodiment, the ERC 200 compiles and organizes the supplemental information, and presents it to the plurality of critical event responders 110. Depending on the nature of the critical event, the ERC 200 can transmit periodic requests for information and update the information as an event unfolds. In this manner, location and time sensitive information can be collected, processed and presented to critical event responders 110 such that the appropriate critical event responders 110 can devise effective and appropriate actions.

Figure 4:
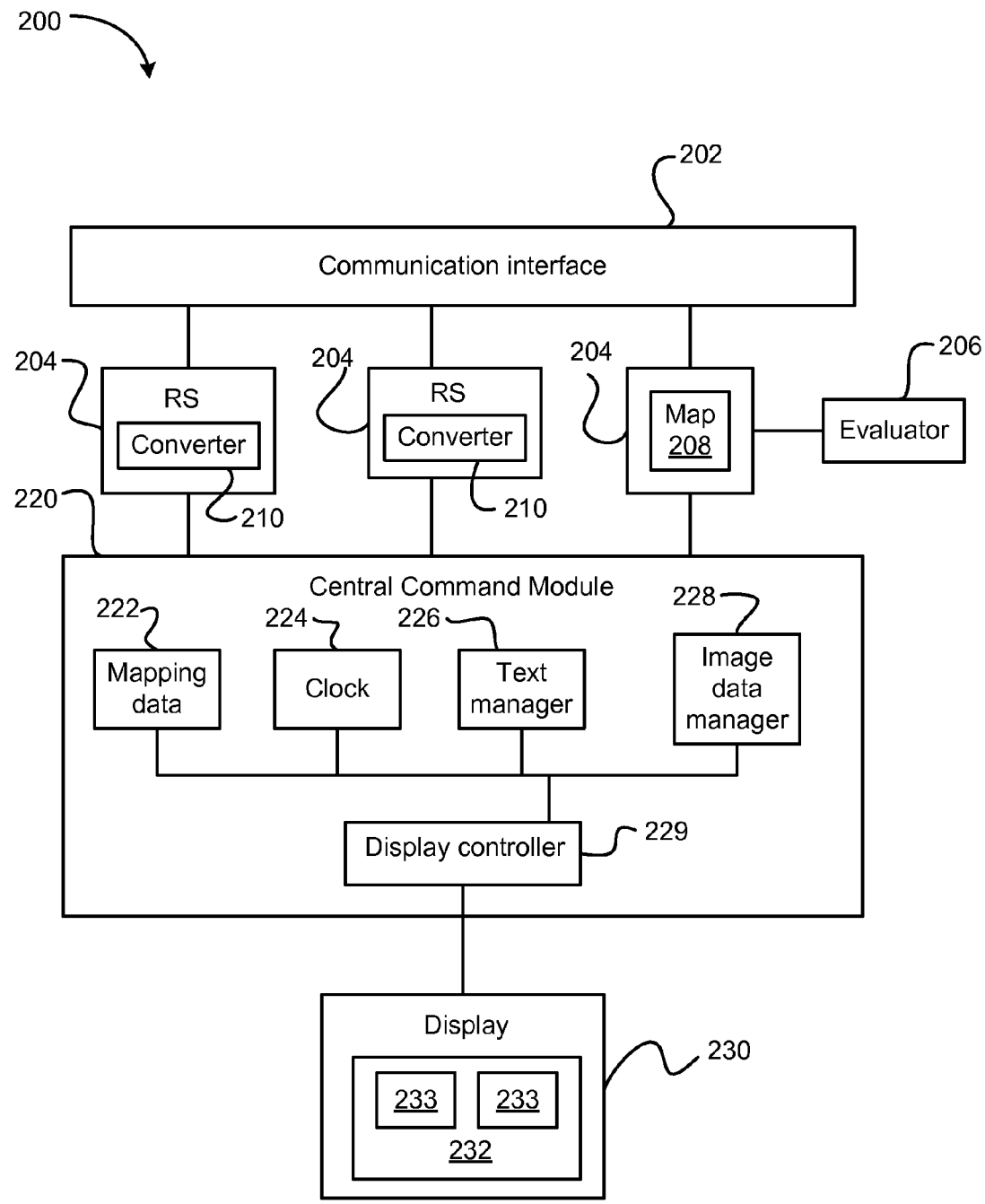
FIG. 4 is a schematic block diagram of an emergency response center according to an embodiment of the present invention.

FIG. 4 is an exemplary block diagram of the ERC 200 according to one embodiment of the present invention. The ERC 200 includes a communication interface 202, a plurality of receiving stations 204, a central command module 220 and a display 230. The communication interface 202 allows the ERC 200 to communicate, i.e., receive and transmit data in a known manner, with the plurality of wireless 10 and wireless 12 networks, and the responders 110. The receiving stations 204 are preferably work stations that receive the data from the communication interface 202 and, if possible, display the data to an evaluator 206 who preferably analyzes the data.

The evaluator 206 can also use the receiving station to have a verbal conversation with the user. In one embodiment, each receiving station 204 includes an audio to text converter 210 that automatically transcribes the verbal conversation into a written report and stores the conversation as an audio clip in memory. Thus, if a responder 110 needs to listen to the live conversation, e.g., for investigative purposes, the responder 110 can retrieve the audio clip from the memory and analyze the conversation. In another embodiment, the evaluator 206 can manually transcribe the conversation into the written report.

In the embodiment shown in FIG. 4, while one evaluator 206 is depicted for the sake of simplicity, each receiving station 204 can be operated by an evaluator 206. Thus, for a relatively small ERC 200, e.g., one that serves a rural area, one or a few evaluators 206 can be sufficient to operate the ERC 200. Whereas, for a large metropolitan city or area, the ERC 200 can include several evaluators 206 and receiving stations 204 to handle the potential volume of information. Hence, the ERC 200 is scalable depending on the area serviced.

The receiving stations 204 are coupled to the central command module 220, which is responsible for organizing the collected information and presenting the information to the responders 110. The central command module 220 includes mapping data 222, a clock 224, a text manager 226 and an image data manager 228. The mapping data 222 includes geographical mapping information including street level data. The central command module 220 can preferably map longitude and latitude coordinates to a street or city level. The clock 224 allows the central command module 220 to place a time stamp on incoming data. The text manager 224 processes text messages received from the reporting devices 50, 52 and the written reports derived from the verbal conversations, while the image data manager 226 manages image data received from the reporting devices 50, 52.

For each text message, written report and/or image associated with a call from a reporting device 50, 52, the central command module 220 timestamps the supplemental information and associates it with the mapping data corresponding to the reporting device 50, 52. The central command module 220 passes that information to a display controller 229.

For a given critical event, the display controller 229 generates a contemporaneous composite diagram 232 that includes at least one situation map 233. Each situation map 233 illustrates a specified area and shows the location of each reporting device 50, 52 in the specified area and the associated information provided by the user of the reporting device 50, 52. The contemporaneous composite diagram 232 is then displayed on a display 230, which can be located at the ERC 200 and/or at any one or all of the responders 110.

Emergency response personnel can analyze the contemporaneous composite diagram 232 on the display 230 and evaluate the information associated with various locations shown on the one or more situation maps 233. The contemporaneous composite diagram 232 can be updated periodically with new information received by the ERC 200. In addition, the emergency response personnel at the ERC 200 (or elsewhere) can make requests for information associated with a particular location, shown or not shown on the contemporaneous composite diagram 232. In a preferred embodiment, on-site emergency response personnel can coordinate requests for supplemental information from off-site responders 110.

Figure 5:
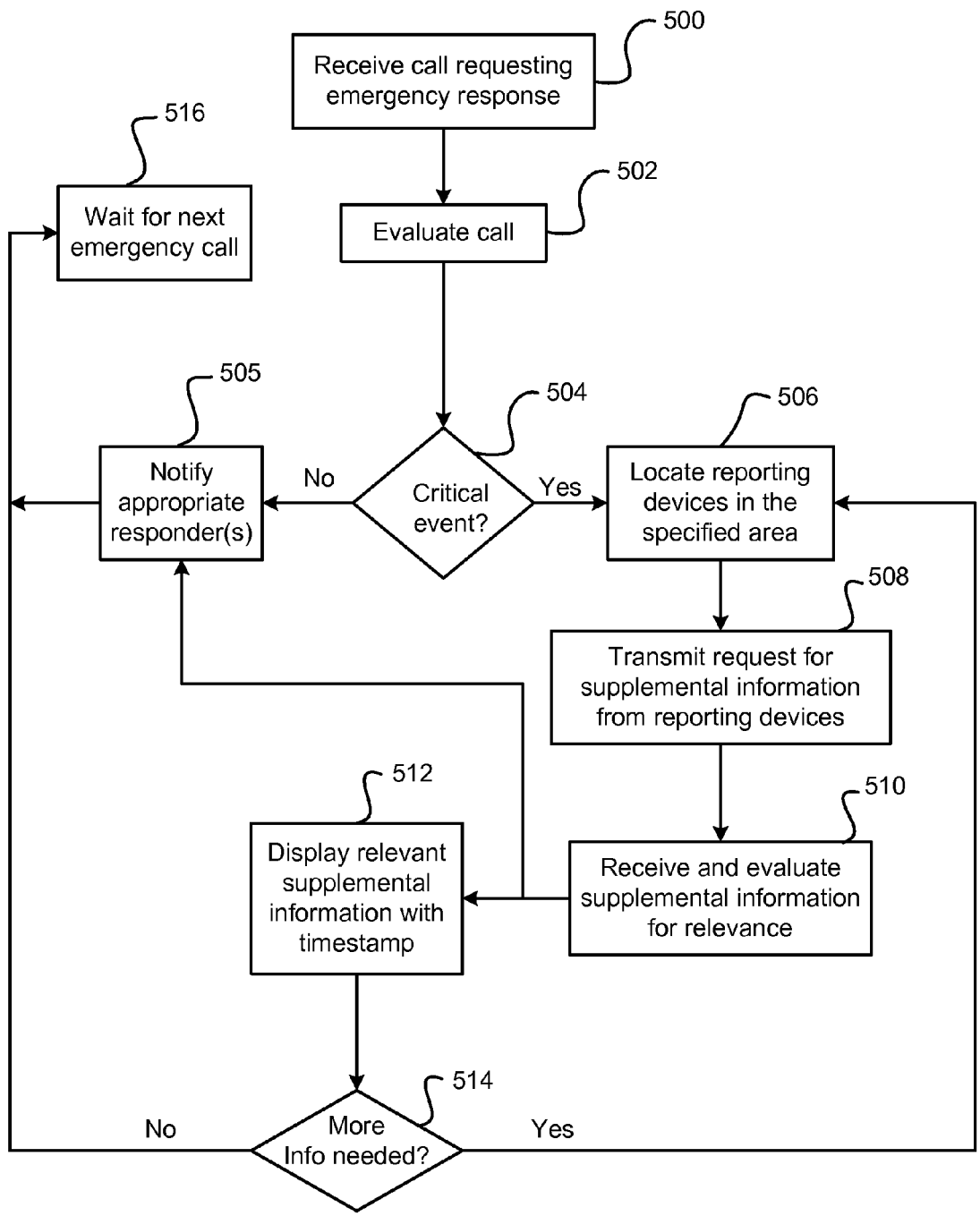
FIG. 5 is a flowchart describing a process for collecting, processing and displaying contemporaneous information according to an embodiment of the present invention.

FIG. 5 is a flowchart illustrating a process for collecting, processing and presenting information related to a critical event according to an embodiment of the present invention. Referring to FIG. 4 and FIG. 5, the process begins when a call requesting an emergency response, i.e., a 911 call, is received (step 500). The call can be received by a 911 operator, or it can be received directly by the ERC 200. If the caller is using a wired device 52, the location of the caller can be determined automatically because the wired device 52 is associated with a fixed location/address. If the caller is using a wireless mobile device 52, the location can be approximated by the base station controller 34 (FIG. 1) or provided by a GPS chipset in the mobile device 52, as discussed above.

Once received, the call is evaluated by the 911 operator or by the evaluator 206 (step 502) to determine whether the situation is a critical event. Whether a situation is a critical event can be defined by a governmental agency or by another public policy making entity. For example, a critical event can be limited to certain situations such as an alleged terrorist attack, a natural disaster, or an abduction.

If the situation is not a critical event (step 504), the appropriate responder(s) 110 is notified (step 505) and the system waits for the next emergency call (step 516). If the situation is identified as a critical event (step 504), the ERC 200 immediately locates reporting devices 50, 52 in a specified area (step 506) related to the critical event. The specified area can be in the vicinity surrounding the location of the caller reporting the critical event, but need not be limited to that area. For example, depending on the situation, the specified area can be entry and exit points, such as bridges and tunnels, or other surrounding regions that may be of interest. Accordingly, the specified area is dynamic. In other words, it can expand or contract and be located away from the location of the critical event.

In a preferred embodiment, the ERC 200 can locate reporting devices 50, 52 by contacting at least one wireless 10 and/or at least one wired 12 network in the specified area.

Wired devices 52 can be located by their phone numbers and associated locations/addresses. Wireless mobile devices 50 can be located by querying the base station controllers 34 in each wireless network 10 for the wireless devices 50 within its service area. A base station controller 34 can then transmit a command over the control channel instructing all mobile devices 50 in the service area to provide its identifying information, including its location data if available.

The identifying information and associated location data for each reporting device 50, 52 is returned to the ERC 200. In one embodiment, one or more receiving stations 204 at the ERC 200 receives the identifying information and associated location data and displays to the evaluator 206 a map 208 of the specified area with marks, e.g., a dot, on the map 208 corresponding to a location of each of the reporting devices 50, 52.

Once the reporting devices 50, 52 in a specified area are located (step 506), the ERC 200 transmits a request to each reporting device 50, 52 located in the specified area for supplemental information regarding the critical event (step 508). In one embodiment, the evaluator 206 at the ERC 200 can use the map 208 and select which of the reporting devices 50, 52 to transmit the request for supplemental information, for example, by pointing to the mark on the map 208 corresponding to the reporting device 50, 52. Alternatively, a "select all" function can be provided, which when selected, automatically transmits the request to all reporting devices 50, 52 on the map 208.

In a preferred embodiment, the ERC 200 can have access to a secure emergency communication channel that preempts all other communication channels. Accordingly, requests from the ERC 200 can interrupt preexisting connections and can block other incoming calls and/or pages.

The request for information can be made by a live operator calling from the ERC 200. Alternatively, the request transmitted by the ERC 200 can be an automated text or voice message instructing the user to provide a written or verbal description of the user's surroundings or what the user has witnessed or is currently observing. The request can also instruct the user to take pictures or video if the reporting device 50, 52 is capable of doing so.

In one embodiment, the ERC 200 transmits the request to the user and if the user answers the call, an automated voice message notifies the user that a critical event is taking place, and to wait to speak to an operator. The receiving station 204 can then connect the operator to the user, thereby saving time. In another embodiment, the automated voice message can ask the user to indicate whether the user has useful information relating to the critical event, by for example, instructing the user to "press 1" if the user has useful information and to "press 2" if the user is not aware of the critical event. In this manner, calls from users having no relevant information can be automatically filtered.

In one embodiment, the receiving stations 204 in the ERC 200 can be coupled to a phone bank (not shown), where live operators can speak directly to users of the selected reporting devices 50, 52. This embodiment can be effective, for example, for severe emergencies where the operator can actively interrogate the user in order to collect pertinent information. The conversation can be transcribed into a written report automatically by the audio to text converter 210 or summarized by the operator. In either case, the live conversation can be recorded and stored for future reference.

The receiving stations 204 at the ERC 200 receive the supplemental information from the reporting devices 50, 52 in the specified area via the wireless 10 and wired 12 networks, and the evaluator 206 analyzes the supplemental information for relevance (step 510). If the information is relevant, it is passed to the central command module 220, which uses the clock 224, the text manager 226 and the image data manager 228 to correlate the information by location and time.

The display controller 229 can add the relevant supplemental information to the appropriate situation map 233 in the contemporaneous composite diagram 232 and then display the relevant supplemental information with a timestamp in the contemporaneous composite diagram 232 (step 512). For example, for a particular reporting device, e.g., a mobile phone 50, located at a particular point, the corresponding situation map 233 can depict the street location of the particular point, the text message, written report and/or images associated with the reporting device 50, and the timestamp indicating when the supplemental information was received. In one embodiment, a responder 110 or emergency response personnel can select the written report and retrieve and play the recorded conversation associated with the written report.

In addition, after the evaluator 206 has analyzed the incoming supplemental information (step 510), the on-site emergency response personnel can notify appropriate and/or additional responder(s) 110 of the critical event based on the supplemental information received from the reporting devices 50, 52 (step 505).

If additional information is needed (step 514), e.g., because the critical event is an ongoing or developing situation or because a responder 110 has made a request for additional information regarding a specified area, the ERC 200 can repeat steps 506 to 512 to gather additional information. If additional information is not needed (step 514), the system waits for another emergency call (step 516).

If additional information is collected, the additional information is then used to update or modify the contemporaneous composite diagram 232. The ability to update the diagram 232 allows the responder(s) 110 to view a critical event as it unfolds and to predict where and/or when future events might take place. For example, supplemental information collected in successive seconds can indicate which direction a suspect's car is moving, and responders 110 can set up road blocks at appropriate intersections. In one embodiment, if successive images are captured at a particular location, the display controller 229 can display the successive images in sequence, creating, in effect, a movie showing the "flow" or progression of events. This function can be controlled locally or remotely by the responders 110.

According to versions of the present invention, contemporaneous information relating to a critical event can be collected from a plurality of reporting devices at specified locations associated with the critical event. This contemporaneous information can include text messages, live voice data and image data. An emergency response center 200 collects the information and displays it in a contemporaneous composite diagram 232 that can include at least one situation map 233 depicting a specified area of interest. The contemporaneous composite diagram 232, which is updateable, allows emergency response personnel 110 to analyze the critical event in a comprehensive manner and to devise an effective response. Because the information on the diagram 232 can be updated continuously, a developing critical situation can be monitored effectively.

The present invention is directed to a method and system for collecting contemporaneous information relating to a critical event. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

I claim:

1. A method for collecting contemporaneous information relating to a critical event, the method comprising:
   receiving a call requesting an emergency response to a critical event;
   in response to receiving the call:
      locating a plurality of reporting devices including a set of mobile devices located in a specified area related to the critical event based on global positioning system (GPS) information associated with each of the mobile devices;
      selecting at least one mobile device to which a request is to be transmitted from the set of mobile devices;
      using at least one communication network to transmit the request for supplemental information from the selected at least one mobile device included in the plurality of reporting devices located in the specified area related to the critical event; and
      receiving the supplemental information over the at least one communication network.

2. The method of claim 1 further including:
   transmitting a second request for additional information from the plurality of reporting devices located in the specified area related to the critical event such that an ongoing critical event can be monitored.

3. The method of claim 2 further comprising:
   using the supplemental and additional information to create an appropriate response to the critical event as the event develops.

4. The method of claim 1 wherein the request for supplemental information is at least one of a live call, an automated text message, and an automated voice message.

5. The method of claim 1 further comprising:
   prior to transmitting the request to the plurality of reporting devices, analyzing the call to determine whether a critical event is being reported; and
   notifying at least one appropriate emergency responder if the event is not a critical event.

6. The method of claim 1 wherein receiving supplemental information includes receiving any one or all of text messages, video clips, captured image data and live voice data.

7. The method of claim 6 further comprising:
   processing the supplemental information to create a contemporaneous composite diagram of the critical event, the composite diagram including at least one situation map including text and image data posted at a location from which the supplemental information originated and a timestamp indicating when the supplemental information was received; and
   displaying the contemporaneous composite diagram.

8. The method of claim 7 further comprising:
   displaying the contemporaneous composite diagram at an emergency responder.

9. A system for collecting contemporaneous information relating to a critical event, the system comprising:
   at least one communication network accessible by a plurality of reporting devices located in a specified area related to the critical event, wherein the plurality of reporting devices includes at least one mobile device; and
   an emergency response center coupled to the at least one communication network, the emergency response center comprising:
      a communication interface for transmitting and receiving data to and from the at least one communication network; and
      a plurality of receiving stations coupled to the communication interface, wherein at least one of the receiving stations is configured for locating a plurality of reporting devices including a set of mobile devices located in a specified area related to the critical event based on global positioning system (GPS) information associated with each of the mobile devices, selecting the at least one mobile device to which the request is to be transmitted from the set of mobile devices, using the at least one communication network to transmit requests for supplemental information regarding the critical event from the selected at least one mobile device included in the plurality of reporting devices located in the specified area related to the critical event, and wherein the at least one receiving station is configured for receiving the supplemental information over the at least one communication network.

10. The system of claim 9 wherein the supplemental information provided by the plurality of reporting devices includes text messages, video clips, captured image data, and live voice data.

11. The system of claim 9 wherein the at least one receiving station includes an audio to text converter for transcribing live voice data from a conversation into a written report.

12. The system of claim 9 wherein the supplemental information is updated periodically or upon request.

13. The system of claim 12, wherein the emergency response center further includes a central command module coupled to the plurality of receiving stations, the central command module for organizing the received supplemental information by time and location to create a contemporaneous composite diagram of the critical event, the composite diagram including at least one situation map with the supplemental information posted at a location from which the supplemental information originated.

14. The system of claim 13 wherein the central command module updates the contemporaneous composite diagram when additional supplemental information is received by the receiving stations.

15. The system of claim 13 wherein the emergency response center further includes a display coupled to the central command module for displaying the contemporaneous composite diagram.

16. The system of claim 13 wherein the communication interface transmits and receives data to and from at least one emergency responder.

17. The system of claim 16 wherein the communication interface is used to transmit the contemporaneous composite diagram to the at least one emergency responder to be displayed on a display at the emergency responder.

18. The system of claim 9 wherein the at least one communication network includes a secure emergency communication channel that is accessible by the emergency response center such that requests transmitted by the emergency response center over the secure emergency communication channel are prioritized over any other communication channel.

* * * * *